(12) United States Patent
Xu et al.

(10) Patent No.: US 11,262,628 B2
(45) Date of Patent: Mar. 1, 2022

(54) LIQUID CRYSTAL DISPLAY PANEL HAVING A COLOR FILTER SUBSTRATE WITH A METAL RING AND METHOD FOR MAKING SAME

(71) Applicant: Century Technology (Shenzhen) Corporation Limited, Shenzhen (CN)

(72) Inventors: Guo-Dong Xu, Shenzhen (CN); Hui Wang, Shenzhen (CN); Ning Fang, Shenzhen (CN); Chen-Fu Mai, New Taipei (TW); Chih-Chung Liu, New Taipei (TW); Meng-Chieh Tai, New Taipei (TW)

(73) Assignee: Century Technology (Shenzhen) Corporation Limited, Shenzhen (CN)

( * ) Notice: Subject to any disclaimer, the term of this patent is extended or adjusted under 35 U.S.C. 154(b) by 0 days.

(21) Appl. No.: 17/000,655

(22) Filed: Aug. 24, 2020

(65) Prior Publication Data
US 2021/0405471 A1 Dec. 30, 2021

(30) Foreign Application Priority Data

Jun. 24, 2020 (CN) .......................... 202010591825.0

(51) Int. Cl.
| | |
|---|---|
| *G02F 1/1362* | (2006.01) |
| *G02F 1/1368* | (2006.01) |
| *G02F 1/1333* | (2006.01) |
| *G02F 1/1335* | (2006.01) |
| *G02F 1/161* | (2006.01) |
| *G02F 1/1679* | (2019.01) |

(Continued)

(52) U.S. Cl.
CPC ...... *G02F 1/136209* (2013.01); *G02F 1/0107* (2013.01); *G02F 1/1339* (2013.01); *G02F 1/1368* (2013.01); *G02F 1/133388* (2021.01); *G02F 1/133509* (2013.01); *G02F 1/133512* (2013.01); *G02F 1/136286* (2013.01); *G02F 1/161* (2013.01); *G02F 1/1679* (2019.01)

(58) Field of Classification Search
CPC combination set(s) only.
See application file for complete search history.

(56) References Cited

U.S. PATENT DOCUMENTS

| | | | |
|---|---|---|---|
| 2012/0188151 A1* | 7/2012 | Oh | ........................ G02F 1/1337 345/88 |
| 2018/0149910 A1* | 5/2018 | Wang | ................ G02F 1/133514 |

FOREIGN PATENT DOCUMENTS

| | | |
|---|---|---|
| CN | 103926739 A | 7/2014 |
| CN | 103926742 A | 7/2014 |

\* cited by examiner

*Primary Examiner* — Lauren Nguyen
(74) *Attorney, Agent, or Firm* — ScienBiziP, P.C.

(57) ABSTRACT

A liquid crystal display panel defines a display area and a non-display surrounding the display area. The panel includes a color filter substrate and a thin film transistor array substrate opposite to the color filter substrate. The color filter substrate includes a first substrate and a black matrix on the first substrate. The black matrix is in the display area and extending to the non-display area. A gap is defined in the black matrix and in the non-display area. The gap extends to be a circle around the display area and divides the black matrix into two independent parts. The color filter substrate includes a second substrate and a metal ring on a side of the second substrate facing the thin film transistor array substrate. The metal ring surrounds the display area and aligns with the gap.

9 Claims, 8 Drawing Sheets

(51) Int. Cl.
*G02F 1/1339* (2006.01)
*G02F 1/01* (2006.01)

LIQUID CRYSTAL DISPLAY PANEL HAVING A COLOR FILTER SUBSTRATE WITH A METAL RING AND METHOD FOR MAKING SAME

FIELD

The subject matter herein generally relates to a liquid crystal display panel and a method for making the liquid crystal display panel.

BACKGROUND

In the liquid crystal display technology, In-Plane Switching (IPS) technology utilizes a fringe electric field generated between the upper and lower electrodes on the thin film transistor array substrate to drive the liquid crystal molecules to rotate on a horizontal plane parallel to the thin film transistor array substrate. When the temperature of the liquid crystal display panel is high and there is a high potential on the thin film transistor array substrate, the black matrix layer of the liquid crystal display panel will have abnormal conductivity. As a result, an abnormal electric field may develop on the electrodes on the thin film transistor array substrate and the black matrix layer, thereby affecting the IPS parallel electric field, causing abnormal liquid crystal alignment in the display area and bright lines to appear on an edge of the display area of the liquid crystal display panel.

Therefore, there is room for improvement in the art.

BRIEF DESCRIPTION OF THE DRAWINGS

Implementations of the present technology will now be described, by way of embodiments only, with reference to the attached figures.

DETAILED DESCRIPTION

Figure 1:
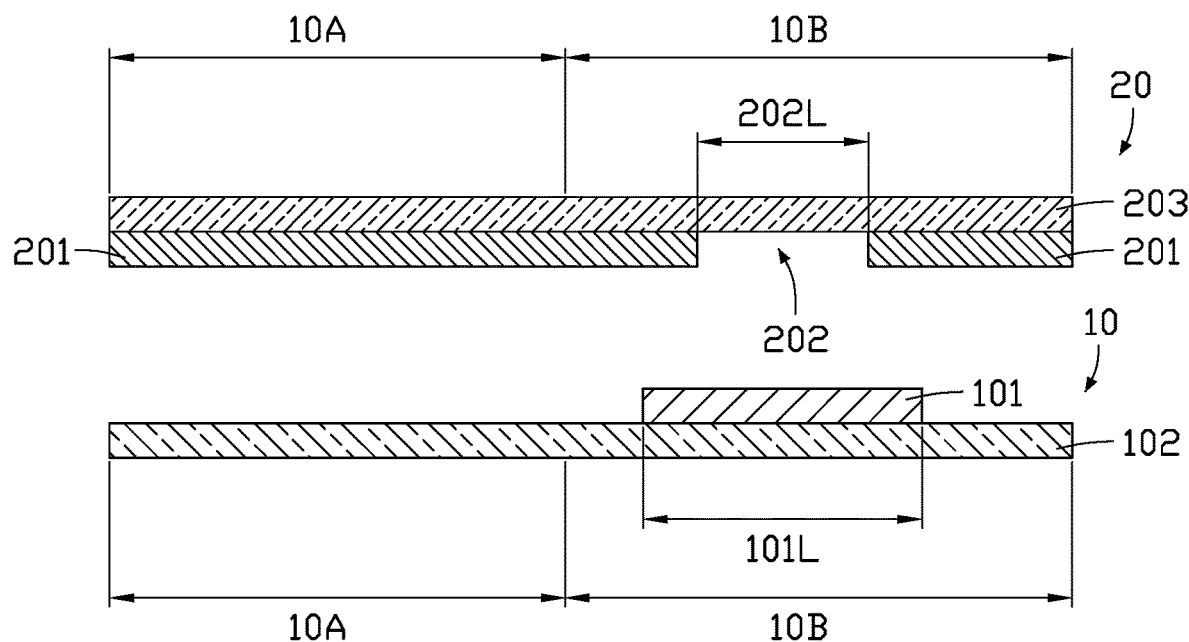
FIG. 1 is a cross-sectional view of a color filter substrate and a thin film transistor array substrate according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series, and the like.

Figure 2:
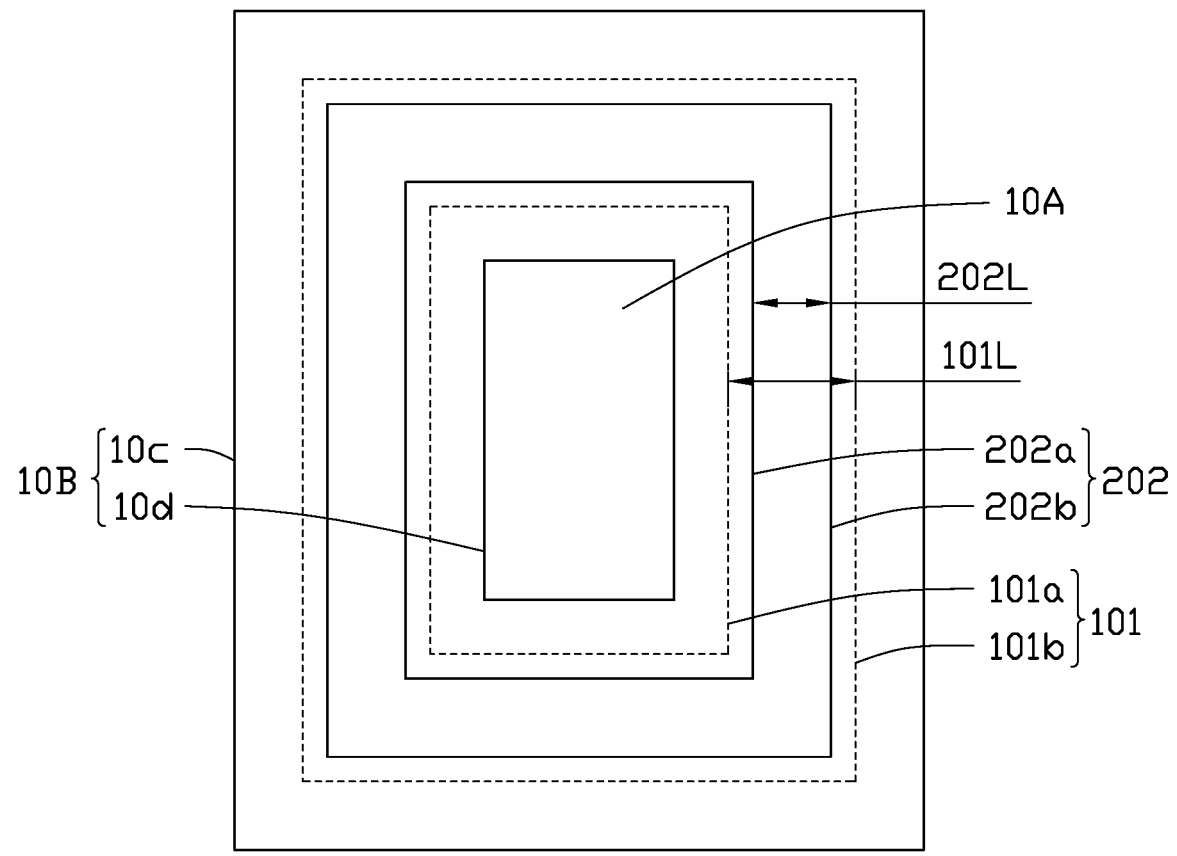
FIG. 2 is a plan view of a liquid crystal display panel according to an embodiment of the present disclosure.

FIG. 1 and FIG. 2 illustrate a liquid crystal display panel 100 of an embodiment. The liquid crystal display panel 100 defines a display area 10A and a non-display area 10B surrounding the display area 10A. As shown in FIG. 2, the non-display area 10B is the area between a boundary line 10c and a boundary line 10d. The display area 10A is the area surrounded by the boundary line 10d. The liquid crystal display panel 100 includes a thin film transistor array substrate 10 and a color filter substrate 20 opposite to the thin film transistor array substrate 10. The color filter substrate 20 includes a first substrate 203 and a black matrix 201 on the first substrate 203. The black matrix 201 is located in the display area 10A and extends in part to the non-display area 10B. The black matrix 201 defines a gap 202 in the non-display area 10B. The gap 202 extends in a circular fashion around the display area 10A, and the gap 202 extends through the black matrix 201. The gap 202 divides the black matrix 201 into two independent parts. As shown in FIG. 2, the gap 202 is defined and bounded by a boundary line 202a and a boundary line 202b. The thin film transistor array substrate 10 includes a second substrate 102. An opaque metal ring 101 surrounding the display area 10A is provided on a side of the second substrate 102 facing the color filter substrate 20. The metal ring 101 corresponds to the gap 202 and aligns with the gap 202. As shown in FIG. 2, a boundary line 101a and a boundary line 101b define and limit the metal ring 101. The metal ring 101 is configured to prevent light leakage around the display area 10A due to the gap 202.

As shown in FIG. 1 and FIG. 2, a width of the metal ring 101 is greater than a width of the gap 202, and a projection of the gap 202 on the thin film transistor array substrate 10 is within the metal ring 101. The width of the gap 202 is a distance 202L between the boundary line 202a and the boundary line 202b, as shown in FIG. 2, and the width of the metal ring 101 is a distance 101L between the boundary line 101A and the boundary line 101b, as shown in FIG. 2.

In this embodiment, the projection of the gap 202 on the thin film transistor array substrate 10 is located in a middle of the metal ring 101, and a width of each side of the metal ring 101 beyond the gap 202 is 10 μm. The metal ring 101 is 20 μm wider than the width of the gap 202. The width of the metal ring 101 being greater than that of the gap 202 is to allow for an oblique viewing angle of the liquid crystal display panel 100, so the metal ring 101 prevents light leakage even from an oblique viewing angle.

In this embodiment, the metal ring 101 may be a metal signal line of the thin film transistor array substrate 10 in the non-display area 10B. In a TN (twisted nematic) type liquid crystal display panel, the metal signal line can be a common electrode line. In an IPS type liquid crystal panel, the metal signal line can be an anti-static signal line. In this embodiment, the metal ring 101 is made of an alloy of molybdenum and aluminum, but not limited thereto.

If the gap 202 in the black matrix 201 is too narrow, abnormal charges on the black matrix 201 of the non-display area 10B can readily have an effect on the normal black matrix 201 in the display area 10A. That is, when the width of the gap 202 is too narrow, abnormal charges cannot be prevented from jumping from a part of the black matrix 201 in the non-display area 10B to a part of the black matrix 201 in the display area 10A. The main function of black matrix 201 is to create shade from light. When the gap 202 is too wide, there is a risk of light leakage around the display area 10A. Therefore, in the present embodiment, the width of the gap 202 is greater than or equal to 20 µm and less than or equal to 100 µm.

Figure 3:
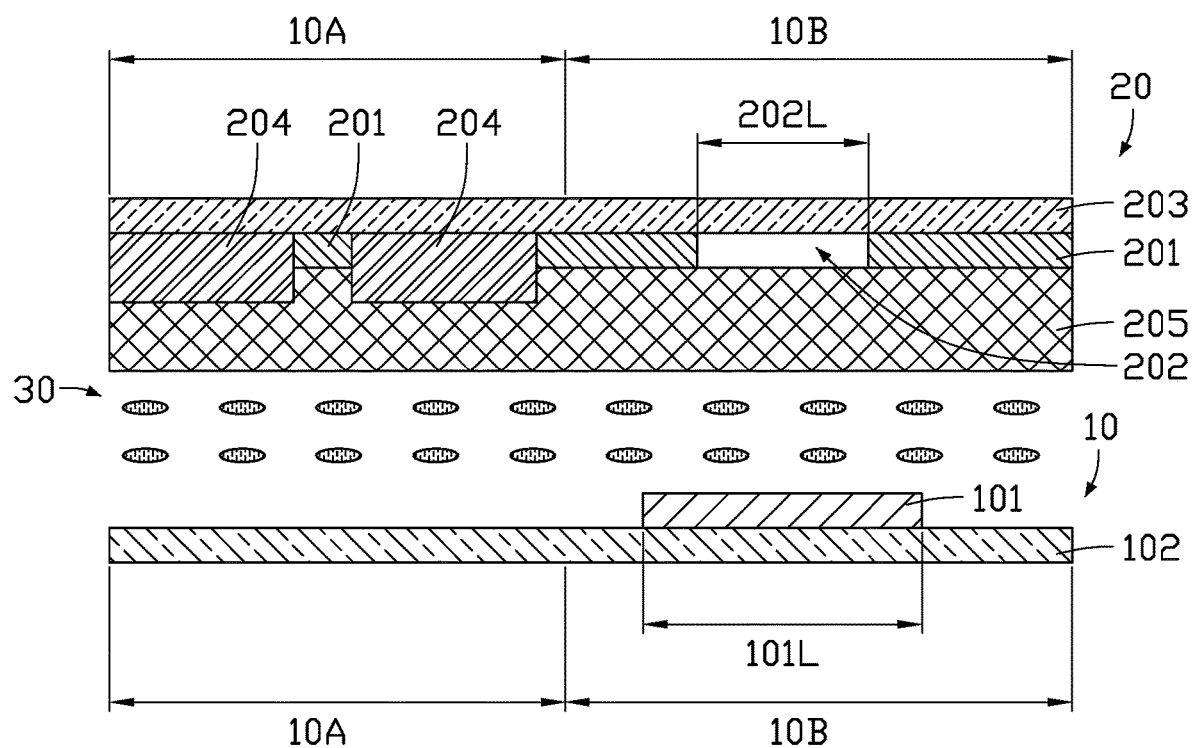
FIG. 3 is a cross-sectional view of a liquid crystal display panel according to an embodiment of the present disclosure.

As shown in FIG. 3, the liquid crystal display panel 100 further includes a liquid crystal layer 30 between the thin film transistor array substrate 10 and the color filter substrate 20. The color filter substrate 20 further includes a plurality of filter units 204 and a planar layer 205. The black matrix 201 is located on the side of the first substrate 203 adjacent to the thin film transistor array substrate 10. The black matrix 201 is configured to block stray light of the liquid crystal layer 30, to prevent different light of the sub-pixels on the liquid crystal display panel 100 from mixing, and to prevent ambient light irradiating the channels of the thin film transistor on the thin film transistor array substrate 10. In this embodiment, the black matrix 201 is a black resin material. The filter units 204 are arranged between the black matrix 201 of the display area 10A, that is, all adjacent filter units 204 are spaced apart from each other by the black matrix 201. The filter units 204 convert the light emitted from a backlight (not shown) of the liquid crystal display panel 100 into red light, green light, and blue light for display. In this embodiment, the filter units 204 include red light filter units, green light filter units, and blue light filter units. Each filter unit 204 is made of red, green, or blue color resistance material. The planar layer 205 is on a side of the first substrate 203 facing the thin film transistor array substrate 10, and the planar layer 205 covers both the black matrix 201 and the filter units 204.

Figure 4:
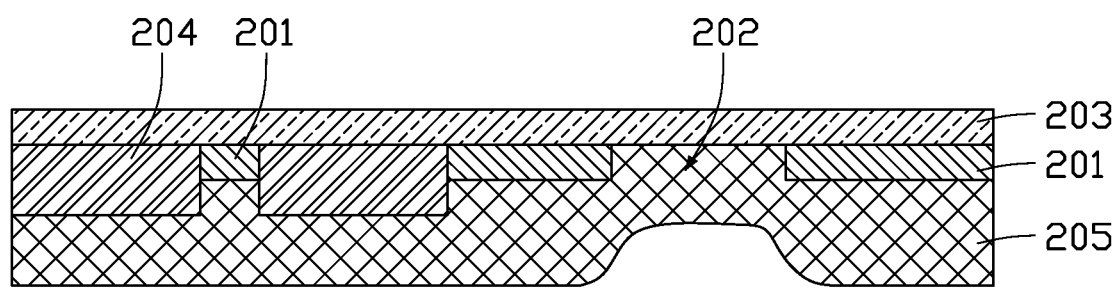
FIG. 4 is a cross-sectional view showing the collapse of a planar layer of the color filter substrate.

As shown in FIG. 4, when the gap 202 is defined in the black matrix 201, there is a collapse of the planar layer 205 due to the gap 202, resulting in the unevenness of the planar layer 205. Such unevenness affects a sealing property of the sealing adhesive of the liquid crystal display panel 100 and the quality of the display of the liquid crystal display panel 100 will be reduced.

Figure 5:
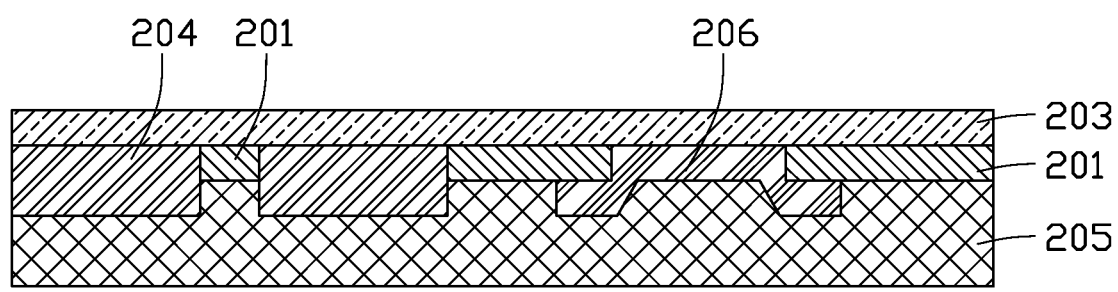
FIG. 5 is a cross-sectional view showing a layer of color resist material filling in a gap of the black matrix.

As shown in FIG. 5, to prevent the low-quality display of the liquid crystal display panel 100, in this embodiment, an insulating filler 206 is filled in the gap 202, and the filler 206 completely covers the gap 202. In this embodiment, the filler 206 is a blue color resistance material or a red color resistance material.

Figure 6:
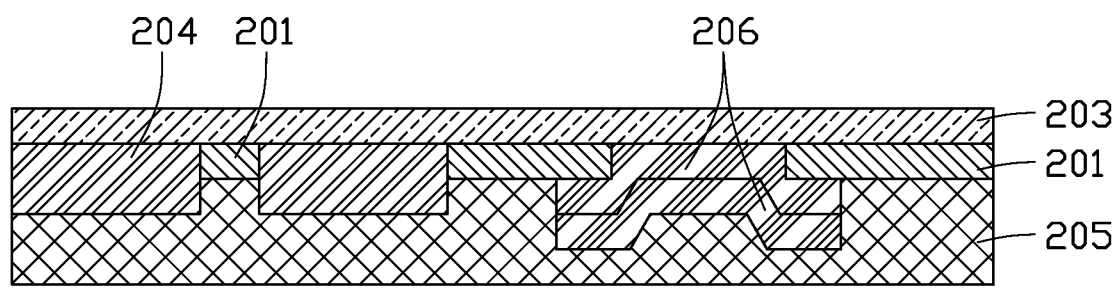
FIG. 6 is a cross-sectional view showing two layers of color resist materials filling in the gap of the black matrix.

As shown in FIG. 6, in one embodiment, the filler 206 includes a blue color resistance material and a red color resistance material stacked in the gap 202. The blue color resistance material and the red color resistance material are stacked in a thickness direction of the liquid crystal display panel 100. The blue color resistance material is between the first substrate 203 and the red color resistance material, or the red color resistance material can be between the first substrate 203 and the blue color resistance material.

Figure 7:
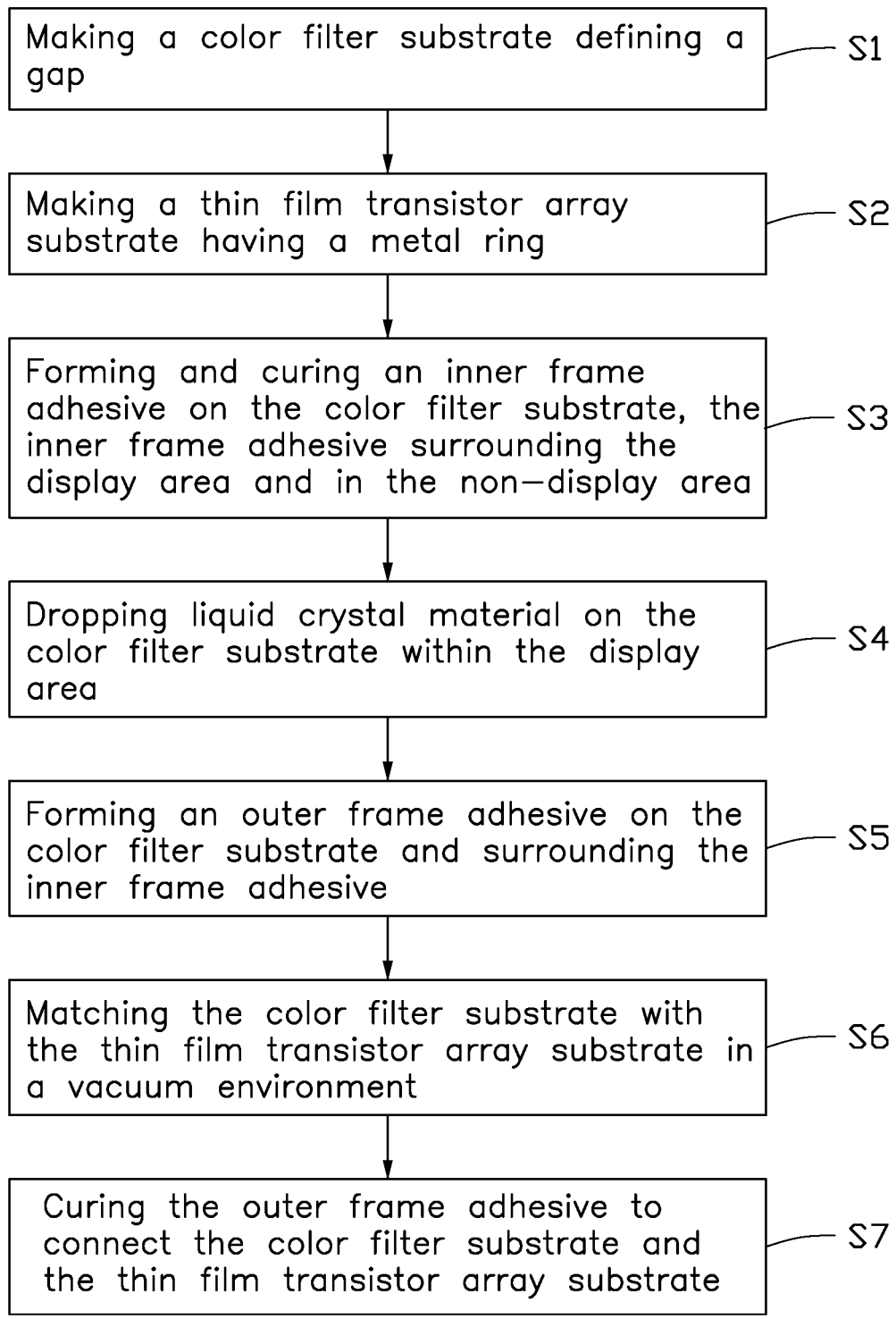
FIG. 7 is a flowchart of a method for making a liquid crystal display panel.

A method for making the liquid crystal display panel 100 is also provided. As shown in FIG. 7, the method includes the following steps. The exemplary method can begin at step S1.

Step S1: making a color filter substrate 20 defining a gap 202.

Step S2: making a thin film transistor array substrate 10 having a metal ring 101.

In the present embodiment, the method further includes steps S3-S7, coupling the color filter substrate 20 and the thin film transistor array substrate 10 together.

Step S3: forming and curing an inner frame adhesive on the color filter substrate 20. The inner frame adhesive surrounds the display area 10A and is in the non-display area 10B.

Step S4: dropping liquid crystal material on the color filter substrate 20 within the display area 10A.

Step S5: forming an outer frame adhesive on the color filter substrate 20 to surround the inner frame adhesive.

Step S6: matching the color filter substrate 20 with the thin film transistor array substrate 10 in a vacuum environment.

Step S7: curing the outer frame adhesive to connect the color filter substrate 20 and the thin film transistor array substrate 10.

Figure 8:
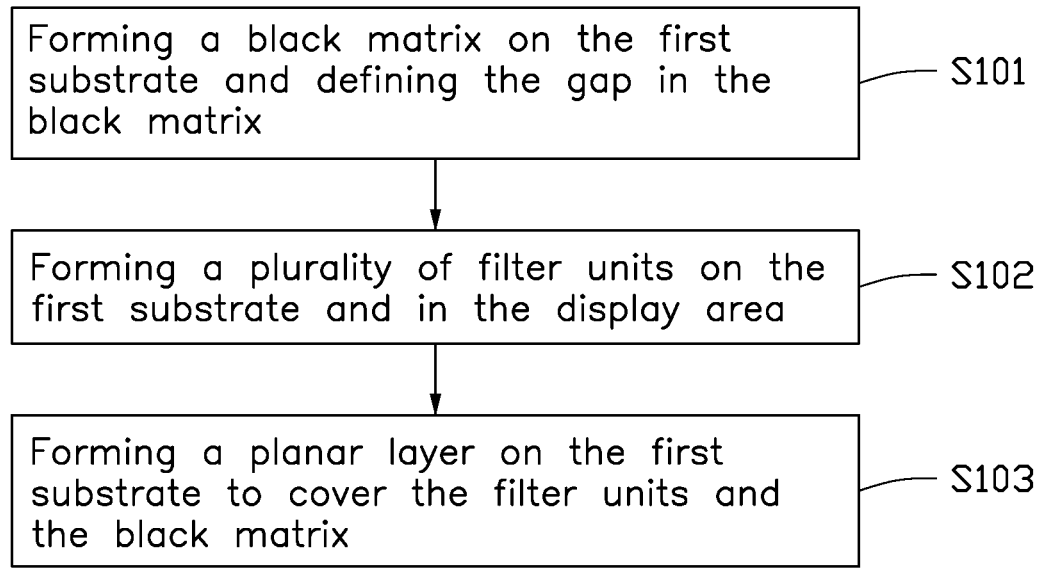
FIG. 8 is a flowchart of step S1 of the method of FIG. 7.

As shown in FIG. 8, in the present embodiment, step S1 for making the color filter substrate 20 comprises the following steps 101-103.

Step S101: forming a black matrix 201 by coating a photoresist material on the first substrate 203, and then defining the gap 202 in the black matrix 201 by a patterning method, such as exposure and development process.

Step S102: forming a plurality of filter units 204 on the first substrate 203 and in the display area 10A.

Step S103: forming a planar layer 205 on the first substrate 203 to cover the filter units 204 and the black matrix 201. The planar layer 205 may be formed by applying a coating of a planar material and thermally solidifying the planar material.

In this embodiment, the step S1 also includes filling at least one of a blue color resistance material and a red color resistance material in the gap 202.

In the present embodiment, in the process of making the thin film transistor array substrate 10, gate electrodes of the thin film transistor or common electrodes of the thin film transistor array substrate 10 and the metal ring 101 may be made from one single metal material layer, to reduce the process steps.

In the liquid crystal display panel 100 of the disclosure, the gap 202 in the black matrix 201 separates the black matrix 201 films with abnormal charges from the black matrix 201 in the display area 10A of the liquid crystal display panel 100. The normal IPS parallel electric field of the display area 10A is thus not affected, and the normal arrangement of the liquid crystals will not be affected, even by abnormal charges of the black matrix 201. Moreover, the metal ring 101 prevents light leakage around the display area 10A caused by the gap 202. The width of the metal ring 101 is larger than the width of the gap 202, so as to prevent light leakage in oblique directions. The gap 202 is filled with the filler 206 effectively resolves the problem of the collapse of the planar layer 205 caused by the gap 202.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A liquid crystal display panel, the liquid crystal display panel defining a display area and a non-display surrounding the display area, comprising:

a color filter substrate, the color filter substrate comprising a first substrate and a black matrix on the first substrate, the black matrix being in the display area and extending to the non-display area, a gap being defined in the black matrix and in the non-display area; wherein the gap extends to be a frame around the display area and divides the black matrix into two independent parts; and a thin film transistor array substrate opposite to the color filter substrate, the color filter substrate comprising a second substrate and a metal ring on a side of the second substrate facing the color filter substrate;

wherein the metal ring surrounds the display area and aligns with the gap; the metal ring is continuous; and a width of the metal ring is greater than a width of the gap.

2. The liquid crystal display panel of claim 1, wherein a projection of the gap on the thin film transistor array substrate is within the metal ring.

3. The liquid crystal display panel of claim 2, wherein the projection of the gap on the thin film transistor array substrate is located in a middle of the metal ring, and a width of each side of the metal ring beyond the gap is 10 μm.

4. The liquid crystal display panel of claim 2, wherein the width of the gap is greater than or equal to 20 μm and less than or equal to 100 μm.

5. The liquid crystal display panel of claim 1, wherein the metal ring is a metal signal line of the thin film transistor array substrate in the non-display area.

6. The liquid crystal display panel of claim 1, wherein an insulating filler is filled in the gap.

7. The liquid crystal display panel of claim 6, wherein the insulating filler is a blue color resistance material or a red color resistance material.

8. The liquid crystal display panel of claim 6, wherein the insulating filler comprises a blue color resistance material and a red color resistance material stacked in a thickness direction of the liquid crystal display panel.

9. The liquid crystal display panel of claim 1, wherein the color filter substrate further comprises a plurality of filter units between the black matrix and a planar layer on a side of the first substrate facing the thin film transistor array substrate, and the planar layer covers both the black matrix and the plurality of filter units.

* * * * *